（12) United States Patent
Chen et al.

(10) Patent No.: US 9,052,513 B2
(45) Date of Patent: *Jun. 9, 2015

(54) LASER SCAN UNIT FOR AN IMAGING DEVICE

(75) Inventors: Fei Chen, Lexington, KY (US); Craig Eric Hadady, Cynthiana, KY (US); Christopher Dane Jones, Georgetown, KY (US); Simarpreet Singh Rattan, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/464,942

(22) Filed: May 4, 2012

(65) Prior Publication Data

US 2013/0121713 A1    May 16, 2013

Related U.S. Application Data

(60) Provisional application No. 61/483,635, filed on May 6, 2011.

(51) Int. Cl.
*B41J 27/00* (2006.01)
*G03G 21/20* (2006.01)
*G02B 26/10* (2006.01)
*G03G 15/04* (2006.01)

(52) U.S. Cl.
CPC .......... *G02B 26/10* (2013.01); *G03G 15/04072* (2013.01); *G03G 2215/0145* (2013.01)

(58) Field of Classification Search
CPC ............... G03G 15/04072; G03G 2215/0145; G02B 26/10
USPC ............ 347/261, 250, 115, 235; 399/51, 221; 359/216.1
See application file for complete search history.

(56) References Cited

U.S. PATENT DOCUMENTS

| 4,257,053 A * | 3/1981 | Gilbreath ..................... 347/261 |
| 5,808,658 A | 9/1998 | Hoover |
| 5,982,408 A * | 11/1999 | Overall et al. ................ 347/250 |
| 6,055,010 A * | 4/2000 | Rockwell et al. ............. 347/250 |
| 6,151,152 A * | 11/2000 | Neary ......................... 359/216.1 |
| 6,163,327 A * | 12/2000 | Mori et al. ..................... 347/115 |
| 7,719,558 B1 * | 5/2010 | Unruh et al. .................. 347/235 |
| 2006/0092405 A1 | 5/2006 | Higashi et al. |
| 2012/0281996 A1 * | 11/2012 | Chen et al. ....................... 399/51 |

\* cited by examiner

*Primary Examiner* — Julian Huffman
*Assistant Examiner* — Carlos A Martinez

(57) ABSTRACT

A system and method for reducing scan line jitter caused by facet cut variation in scan systems employing a plurality of laser sources and a sensor for generating the timing for the laser sources. The system includes a controller for determining a unique time delay for each facet of the rotating mirror, and controlling the laser sources so that video provided by each laser source is delayed in a scan line by the unique time delay corresponding to the facet of the rotating mirror used in creating the scan line.

8 Claims, 8 Drawing Sheets

LASER SCAN UNIT FOR AN IMAGING DEVICE

CROSS REFERENCES TO RELATED APPLICATIONS

Pursuant to 35 U.S.C. §119, this application claims the benefit of the earlier filing date of Provisional Application Ser. No. 61/483,635, filed May 6, 2011, entitled "Laser Scan Unit for an Imaging Device," the content of which is hereby incorporated by reference herein in its entirety.

BACKGROUND

1. Technical Field

The present application relates generally to electronic devices having a laser scan unit (LSU), and particularly to improved electrophotographic devices having reduced jitter and scan line variability for on-axis based LSU systems.

2. Description of the Related Art

In an LSU of an electrophotographic color imaging device, it is typical for each imaging channel to have its own optical sensor, called an "hsync sensor," to detect its laser beam having been deflected from a polygonal mirror and to create a beam detect signal for use in triggering video data being included in the channel's laser beam for impinging on the channel's corresponding photoconductive drum. In more recent LSU design architectures, two beams share a single hsync sensor with one of the channels creating the start of scan (SOS) signal and the other channel using a delayed version of that SOS signal. Because one channel is imaging off of a facet of the rotating polygonal mirror that is not associated with the optical sensor generating the SOS signal, scan jitter can be induced into that channel. With such LSUs generating laser beams on-axis relative to the facets of the rotating polygonal mirror, the laser beams impinge on the polygon mirror such that only the variation in one or more facet cuts of the mirror is seen to induce scan jitter.

What is needed, then, is an improved LSU system which reduces or substantially eliminates scan jitter induced by facet cut variation of the polygonal mirror of an LSU.

SUMMARY

Example embodiments overcome the shortcomings of prior systems and thereby satisfy a significant need for a scanning system having reduced jitter for channels which do not generate synchronization signals for controlling the channels. In accordance with an example embodiment, a scan system includes a rotating mirror having a plurality of facets; a plurality of laser sources, each laser source positioned in proximity to the rotating mirror for generating a laser beam directed thereat; and an optical sensor for receiving one of the laser beams reflected by the facets of the rotating mirror and for generating a horizontal synchronization signal in response to the reception. The system further includes a controller operably coupled to the rotating mirror, the laser sources and the optical sensor, for determining a unique time delay for each facet of the rotating mirror, and controlling the laser sources so that video provided by each laser source is delayed in a scan line by the unique time delay corresponding to the facet of the rotating mirror used in creating the scan line.

Further, the system may measure and accumulate timing information for each facet and average same. From the averaged facet timing information, the system may generate a signature value for each facet and the unique time delay by integrating or combining the time differences of those facets from the detecting facet to the imaging facet, scaling the result by a predetermined value, and adding thereto a predetermined value to ensure that all unique time delays are positive. The unique time delay for each facet is then incorporated into each channel to affect the timing for providing video therein.

BRIEF DESCRIPTION OF THE DRAWINGS

The above-mentioned and other features and advantages of the various embodiments, and the manner of attaining them, will become more apparent and will be better understood by reference to the accompanying drawings, wherein.

DETAILED DESCRIPTION

Figure 1:
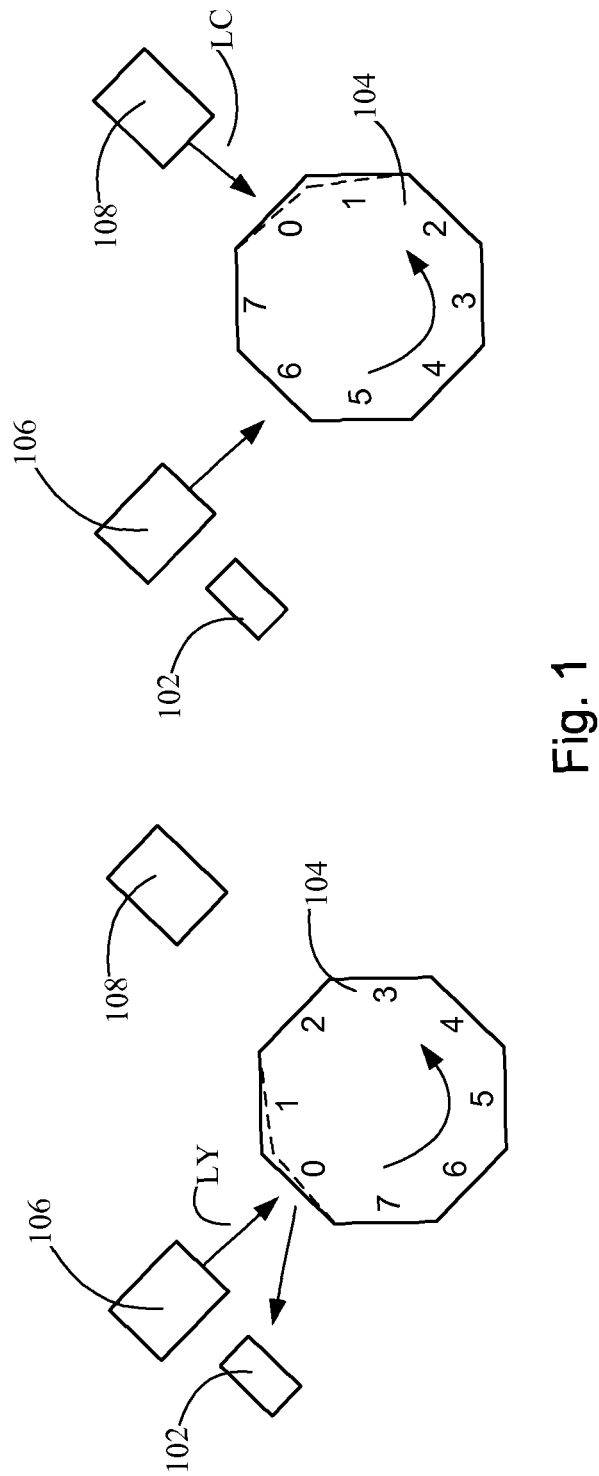
FIG. 1 illustrates a portion of an LSU system in which facet cut variation exists.

The following description and drawings illustrate embodiments sufficiently to enable those skilled in the art to practice it. It is to be understood that the subject matter of this application is not limited to the details of construction and the arrangement of components set forth in the following description or illustrated in the drawings. The subject matter is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present application as defined by the appended claims.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Example embodiments may be implemented in hardware in an integrated circuit, such as an Application Specific Integrated Circuit ("ASIC"). It is understood, however, that example embodiments may be at least partly implemented by a general purpose processor or microcontroller.

Figure 7:
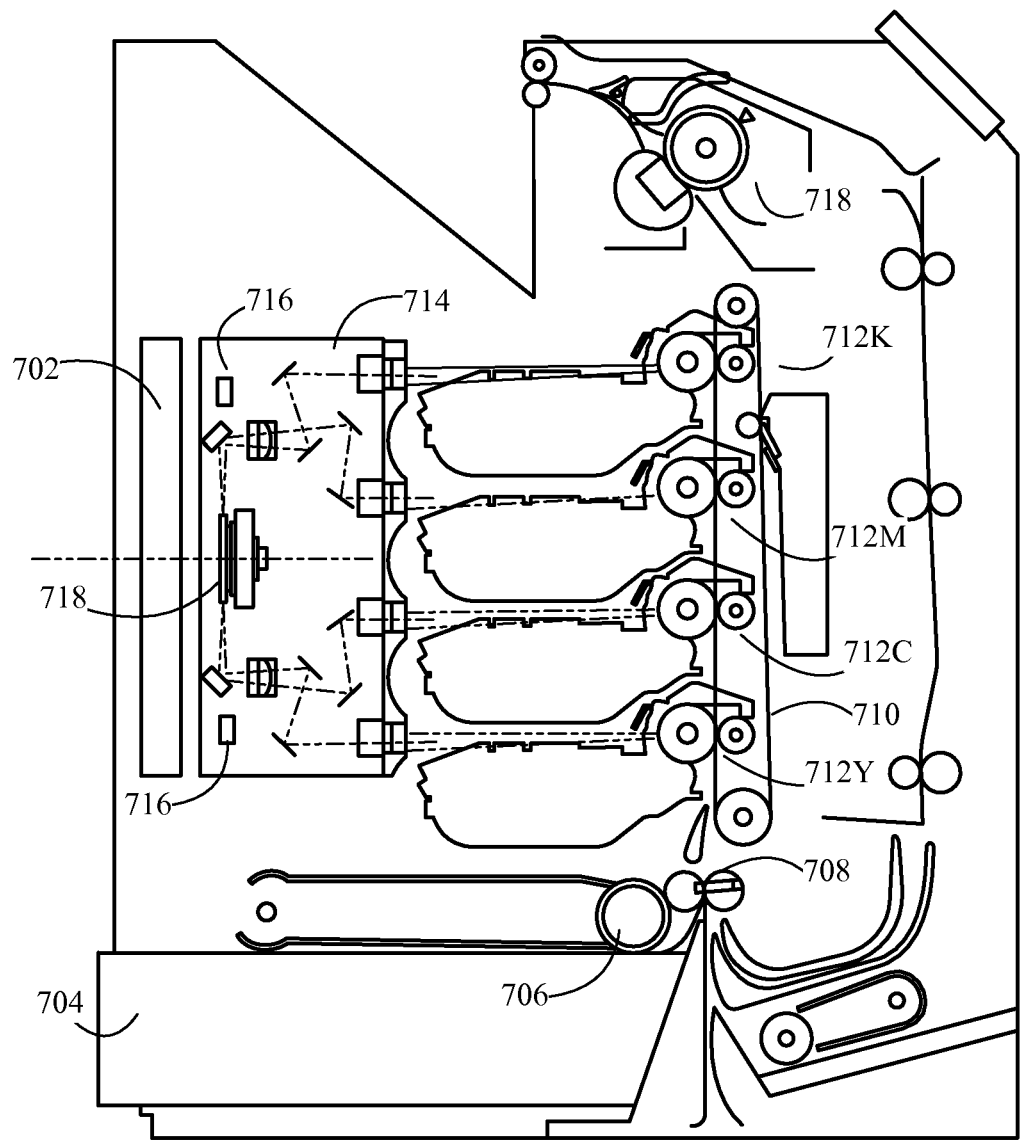
FIG. 7 is a side view of an electrophotographic imaging device incorporating the circuitry and algorithms of the example embodiments.

Referring now to the drawings and particularly to FIG. 7, there is shown an electrophotographic image forming apparatus 700, in this case a color laser printer. An image to be printed is electronically transmitted to a print engine processor or controller 702 by an external device (not shown) or may comprise an image stored in a memory of the controller 702. The controller 702 includes system memory, one or more processors, and other logic necessary to control the functions of electrophotographic imaging.

In performing a print operation, the controller 702 initiates an imaging operation where a top substrate of a stack of media is picked up from a media or storage tray 704 by a pick mechanism 706 and is delivered to a substrate transport apparatus formed by a pair of aligning rollers 708 and a substrate transport belt 710 in the illustrated embodiment. The substrate transport belt 710 carries the picked substrate along a substrate path past each of four image forming stations 712 which apply toner to the substrate. The image forming station 712K includes a photoconductive drum that delivers yellow toner to the substrate in a pattern corresponding to a black (K) image plane of the image being printed. The image forming station 712M includes a photoconductive drum that delivers magenta toner to the substrate in a pattern corresponding to the magenta (M) image plane of the image being printed. The image forming station 712C includes a photoconductive drum that delivers cyan toner to the substrate in a pattern corresponding to the cyan (C) image plane of the image being printed. The image forming station 712Y includes a photoconductive drum that delivers yellow toner to the substrate in a pattern corresponding to the yellow image plane of the image being printed. The controller 702 regulates the speed of the substrate transport belt 710, substrate pick timing, and the timing of the image forming stations 712 to effect proper registration and alignment of the different image planes to the substrate.

To effect the imaging operation, the controller 702 manipulates and converts data defining each of the KMCY image planes into separate corresponding laser pulse video signals, and the video signals are then communicated to a printhead 714. The printhead 714 may include four laser light sources 716 (only two illustrated for reasons of clarity) and at least one polygonal mirror 718 supported for rotation about a rotational axis, and post-scan optical systems receiving the light beams emitted from the laser light sources 716. Each laser of the laser light sources 716 emits a respective laser beam which is reflected off the rotating polygonal mirror 718 and is directed towards a photoconductive drum of a corresponding image forming station 712 by select lenses and mirrors in the post-scan optical systems of printhead 714. Following impingement of laser beams across the photoconductive drums, toner is collected onto the impinged regions which is then transferred to the substrate sheet, after which the transferred toner is fused onto the sheet as it passes through fuser 178, which fuses the toner by application of heat and pressure.

FIG. 1 illustrates an on-axis LSU architecture in which two channels, in this case the channels for colors yellow and cyan, share a single hsync sensor 102. Rotating polygonal mirror 104 is depicted at different times of a single rotation during a laser scan operation. A laser source 106, associated with the imaging of yellow toner, creates a laser beam LY that sweeps across the hsync sensor 102. Hsync sensor 102 generates the SOS signal responsive to detection of beam LY. Yellow video data is triggered by the detection of beam LY, reflecting off mirror 104 and impinging hsync sensor 102. By delaying the beam-detecting hsync event for a time corresponding to the rotation of facets of mirror 104, a laser source 108, corresponding to the imaging of cyan toner, will image off of the same facet of mirror 104 that created the hsync event. In other words, delaying the hsync event for the cyan channel by an amount corresponding to rotating a facet of mirror 104 from being impinged by laser LY to being impinged by laser LC, results in both the yellow and cyan channels imaging off of the same mirror facet. However, due to velocity variations of the motor which rotates mirror 104, the cyan scan line can experience location variation. To compensate for this location variation, the delay from the hsync signal generated by hsync sensor 102 can be reduced to less than one facet. Unfortunately, this forces the cyan channel to image off of a facet of mirror 104 that is different from the facet that created the hsync signal. Depending on the amount of facet cut variation of mirror 104, such an on-axis LSU system induces scan jitter in the cyan channel.

Figure 2:
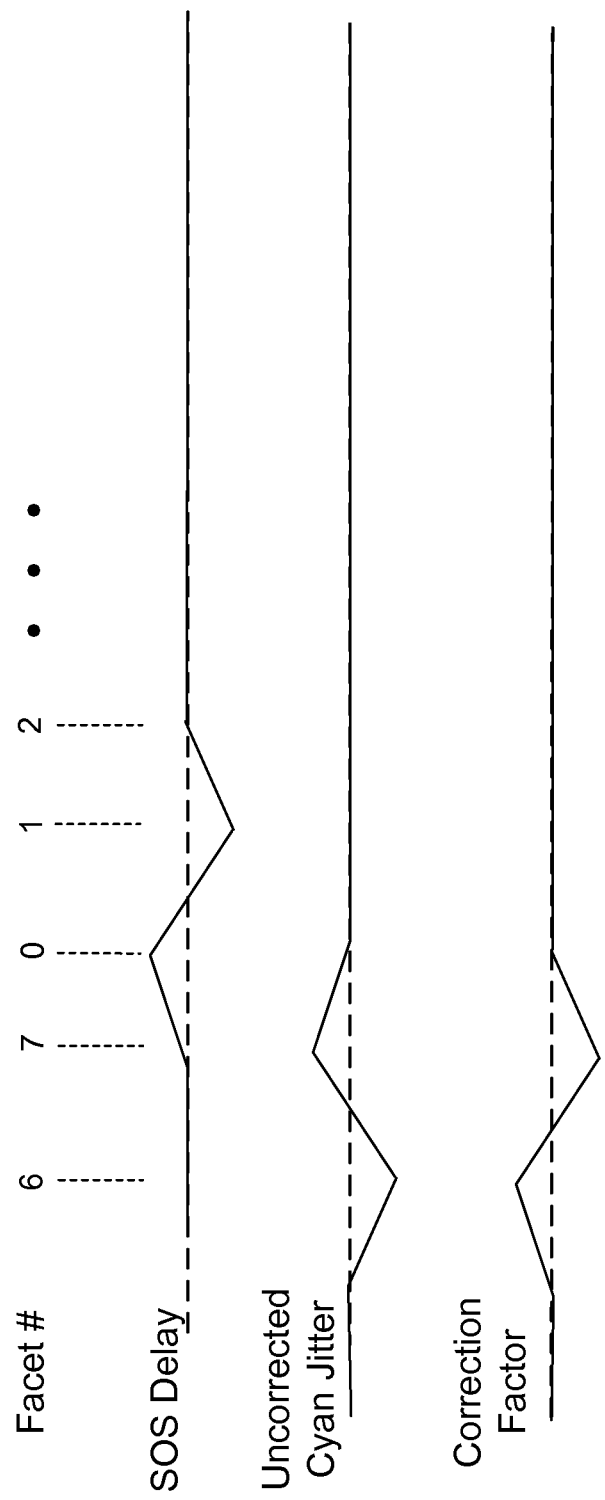
FIG. 2 illustrates mirror facet delay and scan jitter resulting from the variation of FIG. 1.

Facet cut variation in mirror 104 also induces variation associated with the hsync-to-hsync timing. In FIG. 1, mirror 104 is illustrated as having a facet cut variation associated with adjacent facets 0 and 1, shown in dashed lines. This particular facet cut can be seen to change from the ideal the assertion of the SOS signal corresponding to facets 0 and 1. FIG. 2 illustrates variation of the average delay from ideal the assertion of the SOS signal for each facet of mirror 104, with facet 0 providing one timing (delayed) and facet 1 providing a second timing (faster) than the ideal timing for a perfect cut mirror 104. The facet cut variation with respect to facets 0 and 1 causes scan jitter for the cyan channel associated with such facets. A correction factor, applied with respect to the timing of video associated with facets 0 and 1 of mirror 104 for this particular example, substantially reduces scan jitter in the cyan channel. The technique for generating the correction factor is described in detail below.

Figure 3:
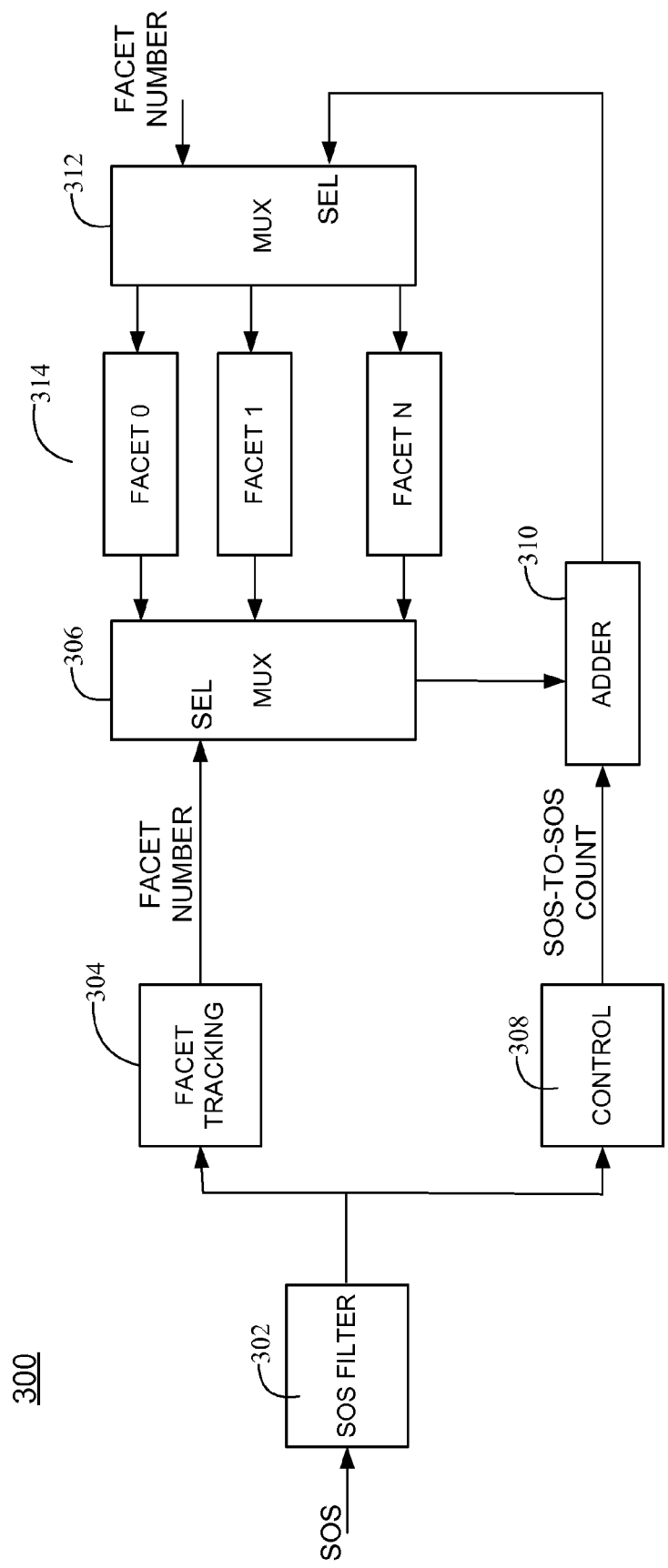
FIG. 3 is a block diagram of circuitry for measuring and tracking hsync-to-hsync delays according to an example embodiment.

FIG. 3 is a block diagram of circuitry 300 utilized for determining hsync-to-hsync delays, i.e., the time delays associated with each facet of mirror 104. Circuitry 300 captures and accumulates the time between hsync signals on a per facet basis for a specified number of scanner rotations. In particular, circuitry 300 receives the SOS signal generated by hsync sensor 102. Hsync sensor 102 asserts its SOS signal each time laser beam LY impinges the sensor. A filter 302 receives the SOS signal and generates a filtered SOS at its output. A facet tracking block 304 receives the filtered SOS signal and tracks the particular facet of mirror 104 used in generating the recent assertion of the SOS signal. The output of facet tracking block 304 is at least one signal which is used to select, via multiplexer circuit 306, previously recorded delay data for the selected mirror facet.

Circuitry 300 further includes control circuitry 308 which receives the filtered SOS signal from filter 302 and a clock signal. The clock signal may be a multiple of the pel clock signal used in delivering video data for each channel of the LSU. Control circuitry 308 includes timer circuitry for generating an output signal of the delay, measured in cycles of the input clock signal, between assertions of the SOS signal. An adder or accumulator 310 receives the SOS assertion delay and the previously recorded facet timing data and generates a sum thereof which is placed at the output of adder 310. A demultiplexer 312 receives the delay sum output of adder 310 and provides same to an output of demultiplexer 312 as selected by the output of facet tracking block 304. Storage 314, which may be implemented as volatile or nonvolatile memory, registers, latches or the like, maintains the delay sum information for each facet of mirror 104.

The operation of circuitry 300 is as follows. Storage 314 maintains previously determined facet delay information for each facet of mirror 104. Hsync sensor 102 asserts the SOS signal each time a facet of mirror 104 reflects laser beam LY onto the sensor. The SOS signal is received and filtered by filter 302. Facet tracking block 304 tracks the particular facet of mirror 104 which deflected laser beam LY and generates a selection signal indicating the particular facet. The selection signal selects the previously determined facet delay information for the particular facet and provides same to adder 310. Meanwhile, control block 308 counts the amount of delay between successive assertions of the SOS signal and provides the delay amount to adder 310, which adds the previously determined facet delay information for the particular mirror facet and the delay between successive SOS signal assertions to obtain a delay sum signal. The delay sum signal is then provided to storage 314 for the particular mirror facet selected. In the example embodiment, the newly generated delay sum signal may replace the previously determined facet delay information for the selected mirror facet identified by facet tracking block 304. This procedure then repeats for each mirror facet for a predetermined number of revolutions of mirror 104. At the end of the predetermined number of revolutions, each location of storage 314 includes the sum of the accumulated delay times for each facet of mirror 104. At the completion of the mirror facet delay measurements, the accumulated delay times maintained in storage 314 may be placed in a buffer (not shown) in which a number of sets of previously measured accumulated delay times may be maintained. The buffer may discard the oldest accumulated delay times when a new set thereof is provided to the buffer. This operation may be performed at the start of each print operation, for example.

Figure 4:
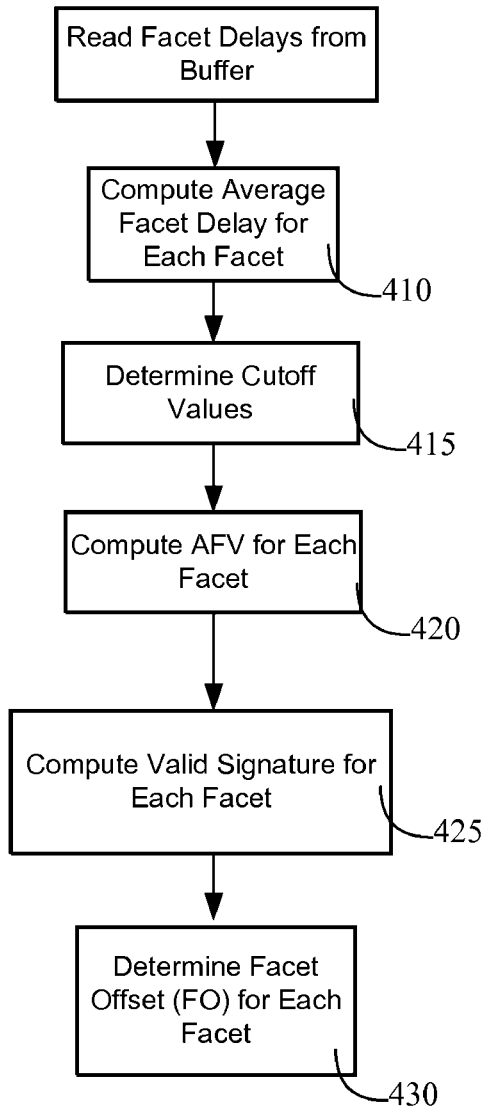
FIG. 4 is a flowchart and corresponding graphs for determining facet offset values according to an example embodiment.
Figure 4:
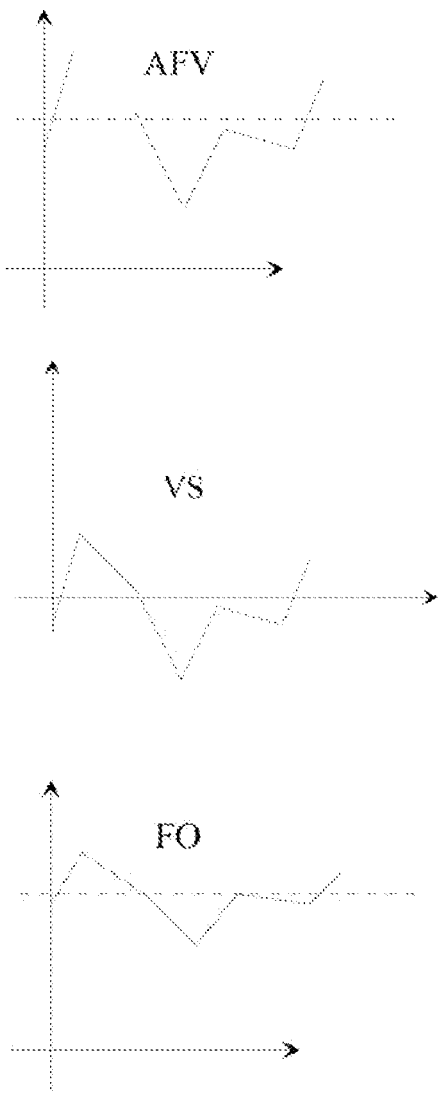

With the above-mentioned buffer containing accumulated delay times for each facet of mirror 104, the controller 702 associated with the LSU determines an offset value to use in triggering the application of video data for use with each facet of mirror 104. With reference to FIG. 4, for each facet of mirror 104, the controller computes an average delay time value at 410. For each mirror facet, this may be the average of the delay times maintained in the buffer. Next, at 415 the controller determines minimum and maximum cutoff values based at least in part on the average delay time computed at 410. Using the cutoff values, the controller 702 at 420 computes an average facet value (AFV) for each facet of mirror 104 by discarding values falling outside of the region bounded by the minimum and maximum cutoff values. The AFV for each mirror facet may be maintained in memory.

Figure 8:
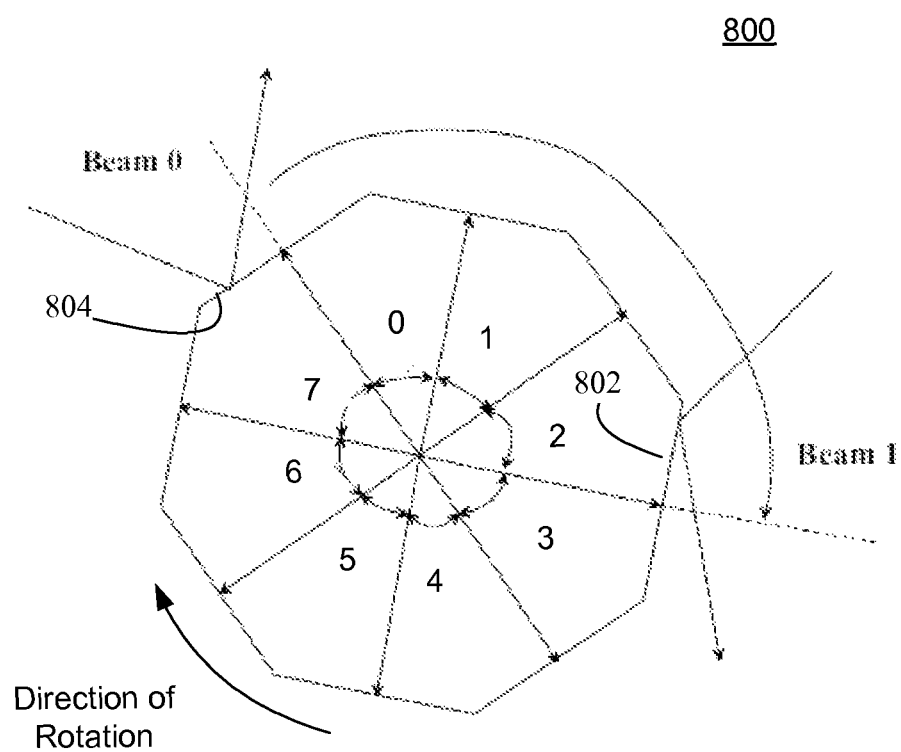
FIG. 8 is a top view of a rotating, polygonal mirror illustrating the use of the sum of time variations between a facet used in detecting a laser beam and a facet used in creating a scan line in an imaging operation.

Next, the controller 702 determines a valid signature VS for each mirror facet at 425 by computing an average of the AFVs of the mirror facets and subtracting the average from each AFV. The valid signatures VS of the mirror facets are signed values indicating facet time variation. The facet time variation is used in the computation of the image start variation values. The image start variation value for a channel is the sum of the facet time variations from the facet detecting the laser beam to the facet used in imaging and is therefore dependent on characteristics such as mechanical layout, facet count, and polygon mirror rotation. The sum of the facet time variation has the units of time and with knowledge of the optical system, the sum of the facet time variation is scaled to convert from time to distance variation at the photoconductive drum to generate at 430 a facet offset FO value for each facet of mirror 718. FIG. 8 depicts an eight faceted polygon mirror 800 with the detection facet 802 three facets away from the imaging facet 804. The facet offset FO of a mirror facet is used in the LSU system in triggering the inclusion of video data in the laser beam when reflecting from the mirror facet.

Figure 5:
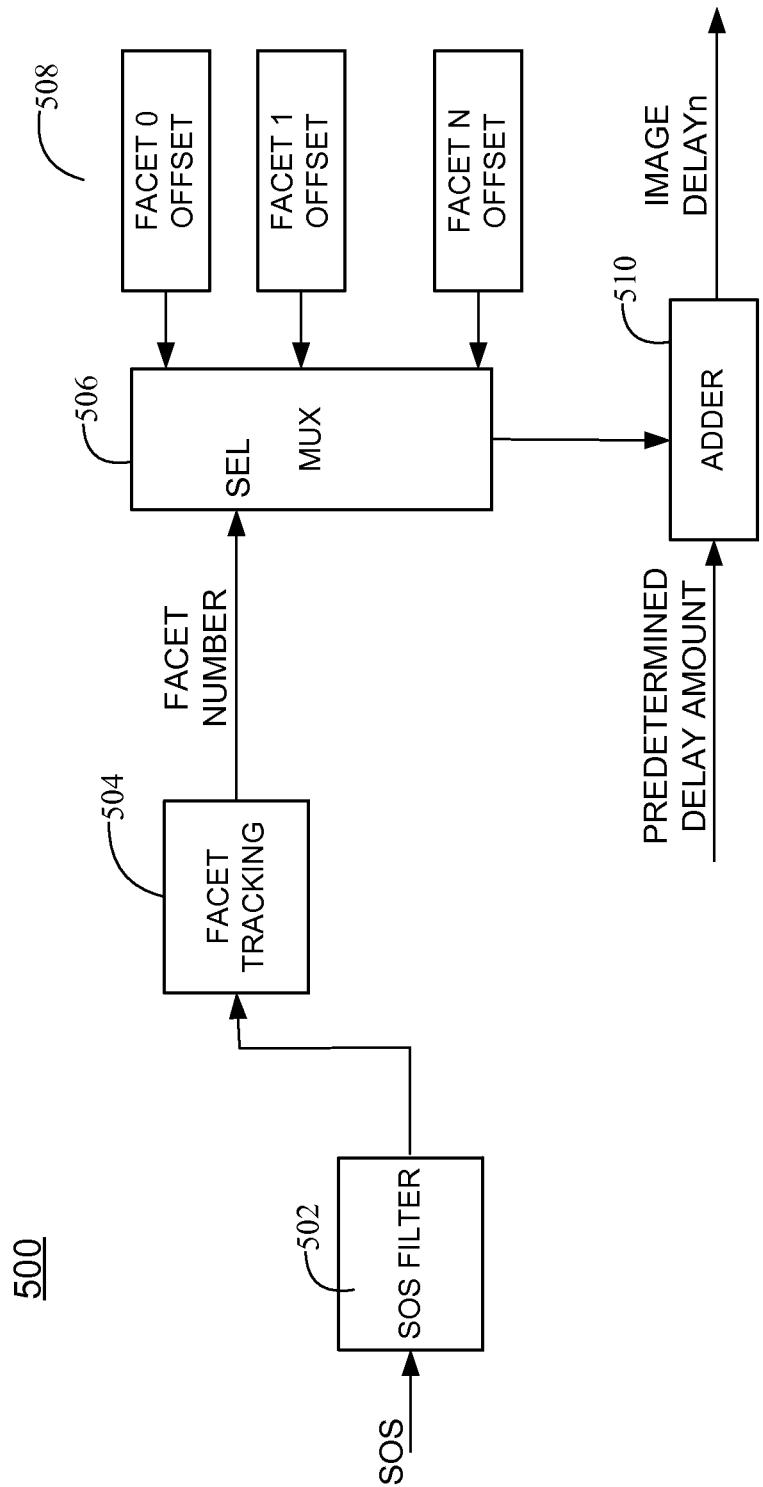
FIG. 5 is a block diagram of circuitry for utilizing the determined facet offset values for reducing scan jitter according to an example embodiment.

With reference to FIG. 5, there is shown a block diagram of the facet offset circuitry 500 for using the facet offsets FOs for triggering video data in the laser beams for impingement on the photoconductive drums. In one example embodiment, blocks of circuitry 300 (FIG. 3) that are common may be utilized in facet offset circuitry 500 in order to reduce circuit (chip and/or board) size. In another example embodiment, each of the blocks of facet offset circuitry 500 may be separate from the blocks used in circuitry 300. The description of facet offset circuitry 500 will be described following the latter example embodiment. A SOS filter 502 may receive the SOS signal from the hsync sensor 102 and generate a filtered version thereof at its output. A facet tracking block 504 receives the filtered SOS signal and tracks the particular facet used in generating the SOS signal. The output of facet tracking block 504 is at least one signal which selects the facet offset FO value for the particular facet tracked. In particular, the output of facet tracking block 504 is the selection input of multiplexer circuitry 506, which includes a data input for each facet offset FO maintained in storage 508. In this way, facet tracking block 504 tracks the current facet used in generating the most recent assertion of the SOS signal and selects the facet offset FO value corresponding to the current facet.

Figure 6:
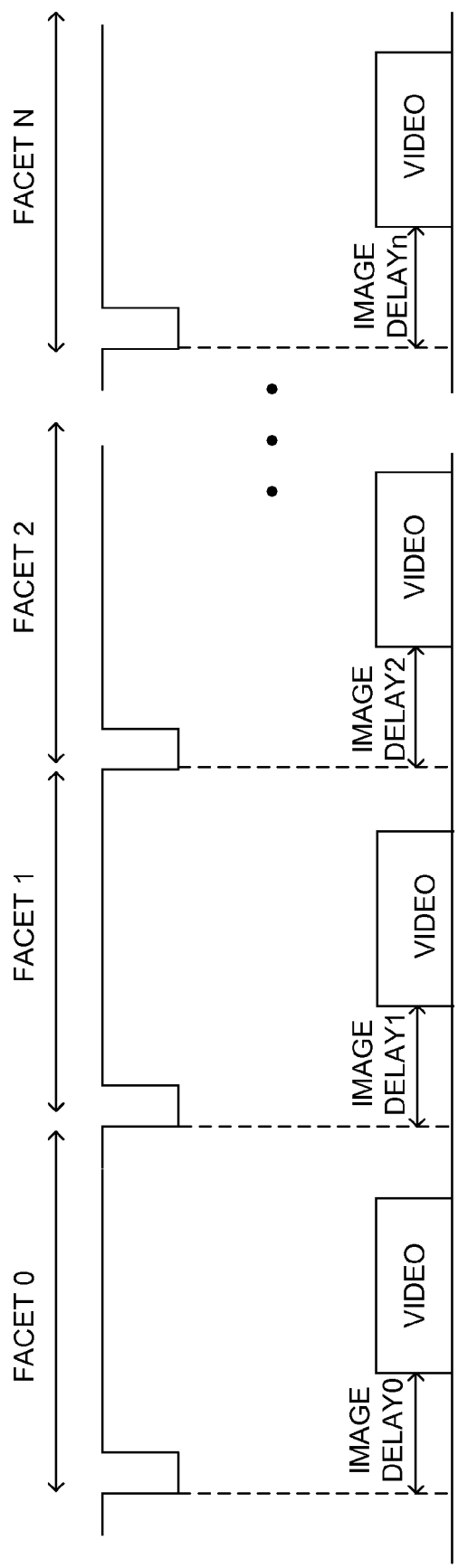
FIG. 6 illustrates the results of utilizing the determined facet offset values of FIG. 4.

An adder or accumulator 510 receives a predetermined image delay value at a first input and the output of multiplexer circuitry 506 at a second input, and generates a sum of thereof at the output of adder 510. In an example embodiment, the predetermined image delay value may be a constant. Thus the sum output of adder 510 is an image delay value for the current mirror facet that is based in part upon the facet offset FO value corresponding thereto. This image delay value is amount of delay following the assertion of the SOS signal before video data is included in the laser signal. FIG. 6 illustrates the use of the image delay value of each facet of mirror 104 used by each channel. As can be seen, the video to be reflected from a particular facet of mirror 104 is delayed by the image delay value corresponding to the particular facet. By providing a correction factor, in this case a unique facet offset FO for each mirror facet, to the channels that are not involved in the creation of the hsync signal, scan jitter is substantially reduced in such channels.

The foregoing description of several methods and an embodiment of the invention have been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A laser scan unit for an imaging device, comprising:
a rotating mirror having a plurality of facets;
a plurality of laser sources, each laser source positioned in proximity to the rotating mirror for generating a laser beam directed thereat;
an optical sensor for receiving one of the laser beams reflected by the facets of the rotating minor and for generating a horizontal synchronization signal in response to the reception; and
a controller operably coupled to the rotating mirror, the laser sources and the optical sensor, for determining a unique time delay for each facet of the rotating mirror, and controlling the laser sources so that video provided by each laser source is delayed in a scan line by the unique time delay corresponding to the facet of the rotating mirror used in creating the scan line; wherein the controller is configured to determine, for each facet of the rotating mirror, a facet offset value based upon an average time delay between successive assertions of the horizontal synchronization signal corresponding to the facet, and to delay transmission of video data by the laser sources by at least the facet offset value, the facet offset value comprising the unique time delay.

2. The laser scan unit of claim 1, further comprising first circuitry having an input coupled to the optical sensor, the first circuitry for measuring a time duration between successive assertions of the horizontal synchronization signal and providing a measured time duration corresponding to each facet of the rotating minor.

3. The laser scan unit of claim 2, wherein the first circuitry comprises second circuitry having an input coupled to the horizontal synchronization signal and an output, for tracking the facet of the rotating minor most recently used in generating an assertion of the horizontal synchronization signal.

4. The laser scan unit of claim 3, wherein the first circuitry further comprises third circuitry for storing, for each facet of the rotating mirror, an accumulation of the time durations, and an adder circuit having a first input corresponding to a measured time duration from the most recent assertion of the horizontal synchronization signal, a second input coupled to an output of the third circuitry and an output coupled to an input thereof, the output of the adder circuit generating the accumulation of time durations for each facet of the rotating minor over a predetermined number of revolutions thereof.

5. The laser scan unit of claim 1, wherein the controller determines, for each facet of the rotating mirror, a facet signature based upon the average time delay thereof, the facet offset for each facet of the rotating mirror being based upon the facet signature thereof.

6. The laser scan unit of claim 5, wherein for each facet of the rotating mirror, the controller integrates the facet signature from detecting facet to imaging facet and scales the integrated result by a predetermined factor to produce a scaled signature and adds a predetermined amount to the scaled signature to determine the facet offset value.

7. A method of controlling a laser scan unit of an imaging device, comprising:
   rotating a mirror having a plurality of facets;
   directing a plurality of light beams towards the mirror;
   sensing, by a sensor, a first light beam of the plurality of light beams reflected from the mirror;
   generating a synchronization signal based upon the sensing of the first light beam;
   generating a scan pattern from a plurality of scan lines created by each light beam reflecting from the minor; and
   determining, by control circuitry, a unique time delay for each facet of the rotating mirror based in part upon the synchronization signal, and controlling the laser beams directed towards the mirror so that video data provided in the light beams is delayed in a scan line by the unique time delay corresponding to the facet of the rotating mirror used in creating the scan line;
   wherein the determining a unique time delay comprises measuring a time duration between successive assertions of the synchronization signal and providing a measured time duration corresponding to each facet of the rotating minor;
   wherein the determining a unique time delay further comprises generating, for each facet, an accumulated time duration from a plurality of the measured time durations taken during rotating the minor a predetermined number of revolutions, and saving the accumulated time duration in memory; and
   wherein the determining a unique time delay further comprises, for each facet of the minor, determining a plurality of delay values associated with each facet of the minor, averaging the delay values, calculating a signature from the averaged delay value and determining the unique time delay by scaling the signature and adding a predetermined value thereto.

8. A method of controlling a laser scan unit of an imaging device, comprising:
   rotating a mirror having a plurality of facets;
   directing a plurality of light beams towards the mirror;
   sensing, by a sensor, a first light beam of the plurality of light beams reflected from the minor;
   generating a synchronization signal based upon the sensing of the first light beam;
   generating a scan pattern from a plurality of scan lines created by each light beam reflecting from the minor; and
   determining, by control circuitry, a unique time delay for each facet of the rotating mirror based in part upon the synchronization signal, and controlling the laser beams directed towards the minor so that video data provided in the light beams is delayed in a scan line by the unique time delay corresponding to the facet of the rotating mirror used in creating the scan line, wherein the determining a unique time delay further comprises, for each facet of the minor, determining a plurality of delay values associated with each facet of the minor, averaging the delay values, calculating a signature from the averaged delay value and determining the unique time delay by scaling the signature and adding a predetermined value thereto.

* * * * *